United States Patent [19]

Brechbühl et al.

[11] Patent Number: 5,513,534
[45] Date of Patent: May 7, 1996

[54] PRESSURE TRANSDUCER COMPENSATED FOR THERMAL SHOCK IMPLEMENTING BRIDGE GIRDER PARALLELOGRAM TYPE DIAPHRAGM STRUCTURE

[75] Inventors: Stefan Brechbühl, Weinfelden; Ernst Pletscher, Marthalen, both of Switzerland

[73] Assignee: K.K. Holding AG, Winterthur, Switzerland

[21] Appl. No.: 318,292

[22] Filed: Oct. 5, 1994

[30] Foreign Application Priority Data

Oct. 13, 1993 [CH] Switzerland ............... 03075/93-8

[51] Int. Cl.⁶ ............... G01L 7/08; G01L 19/04
[52] U.S. Cl. ............... 73/715; 73/708
[58] Field of Search ............... 73/115, 708, 715, 73/723

[56] References Cited

U.S. PATENT DOCUMENTS

| | | | |
|---|---|---|---|
| 3,857,287 | 12/1974 | Sonderegger et al. | 73/715 X |
| 4,399,706 | 8/1983 | List et al. | 73/708 |
| 4,711,129 | 12/1987 | Stubenberg et al. | 73/708 |
| 4,986,129 | 1/1991 | Ruckenbaner et al. | 73/723 X |
| 5,168,192 | 12/1992 | Kosugi et al. | 73/715 X |

*Primary Examiner*—Richard Chilcot
*Assistant Examiner*—Joseph L. Felber
*Attorney, Agent, or Firm*—Barnes & Thornburg

[57] ABSTRACT

The invention concerns an important innovation for combustion engine research, whereby thermal shocks overlaid upon the pressure cycles are compensated. For this a diaphragm construction is proposed consisting of an annular plate and central plate, which is joined to an annular support in such a way that a bridge girder structure with double parallelogram support results. The position and thickness of the central plate are optimizable, and it serves as an actuator element for controlling the compensation process via the double parallelogram structure. At the same time, the central plate is raised to a significantly higher temperature level by controlled heat conduction paths. A novel thermal shock compensation is achieved by these two measures. Further improvement is possible by stepwise optimization of the central plate, by turning it on a lathe and comparing it in the test engine for example.

13 Claims, 4 Drawing Sheets

PRESSURE TRANSDUCER COMPENSATED FOR THERMAL SHOCK IMPLEMENTING BRIDGE GIRDER PARALLELOGRAM TYPE DIAPHRAGM STRUCTURE

BACKGROUND AND SUMMARY OF THE INVENTION

Pressure transducers fitted into the surface of the combustion chamber are used for researching and also monitoring combustion engines. Consequently their diaphragms are exposed not only to the gas pressure but also to severe thermal shocks resulting from the flame propagation, which overlay additional errors upon the actual pressure pattern. Thus the expansion phases are mostly measured with considerable errors.

For years designers of pressure transducers have therefore endeavoured to reduce the thermal shock effects to a minimum by means of thermally insulating covering layers, heat shields or multiple plate diaphragms. Such frontal protection usually involves placing additional mass before the sensor element, which may give rise to increased acceleration error signals so that valve impacts also produce a pressure error signal.

The thermal-shock-compensated diaphragm design according to the invention embodies a different approach by incorporating in the diaphragm parts that are as thin and therefore as light as possible. By means of the thermal component a light, elastic supporting structure in the form of a parallelogram which causes a distortion of the flexurally elastic central plate, the distortion mass of which is optimized so that the resulting double parallelograms impose a compensating action on the sensor transmission element, enabling the thermal shock to be largely compensated. Moreover the elastic design of the four main elements of the diaphragm structure:

the outer sleeve the annular plate the central plate and the annular support promotes optimal stress behavior for continuous operating states too in particular, by means of defined joint points. Instead of protecting the diaphragm parts against thermal effects by every means possible, the action of the thermal shocks is itself utilized to achieve a compensating effect by means of parallelogram displacement. The invention thus adopts an entirely new approach by deliberately exploiting the thermal distortion on a newly designed part of the diaphragm—the central plate —so that this distortion is diverted into a compensating movement by means of an intelligent supporting element.

DETAILED DESCRIPTION OF THE PREFERRED EMBODIMENTS

Figure 1:
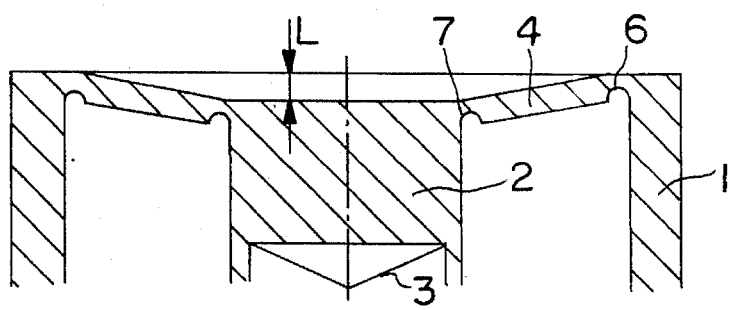
FIG. 1 Section through the diaphragm part of a prior art pressure transducer.
Figure 2:
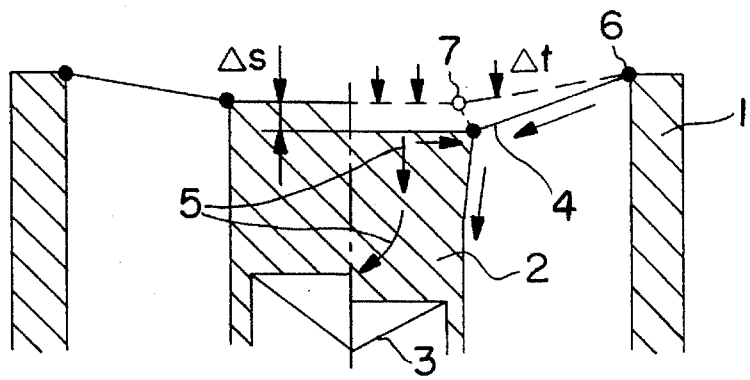
FIG. 2 Jointed bar simulation of the diaphragm support in FIG. 1 (state of the art).

The state of the art is shown in FIGS. 1 and 2.

FIG. 1 shows a section through the diaphragm part of a prior art pressure transducer. The diaphragm adjoins the outer sleeve 1. It consists of the annular plate 4 which is joined to the pressure transmission element 2 through elastic joint points 6 and 7. The central part of the diaphragm is at the same time the pressure transmission element 2 of the transducer, while 3 is the sensor element which converts the pressure force into an electrical measuring signal.

FIG. 2 shows the deformation caused by a temperature shock At on the diaphragm part represented by jointed bars. The lateral expansion of the surface of the pressure transmission element 2 induces a displacement $\Delta S$, which produces an error signal in the sensor element 3 that is further amplified by the thermal lengthening of the annular plate 4. Owing to the rapid dissipation of the heat from the surface into the pressure transmission element 2, the surface temperature is lowered again and at the next cycle there is once again a full thermal gradient onto the surface with corresponding error signal effect. 5 represents the direct heat flow to the sensor element.

Figure 3:
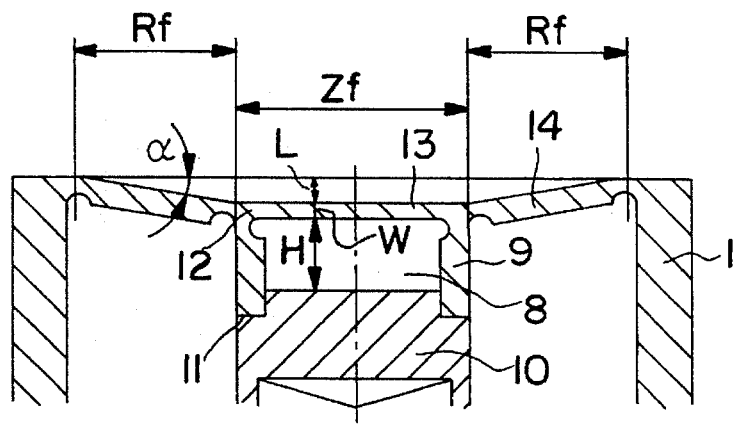
FIG. 3 Section through the diaphragm part of a thermal-shock-compensated pressure transducer according to the invention.

FIG. 3 shows a typical thermal-shock-compensated pressure transducer according to the invention. Instead of the solid central diaphragm part it has a thin central plate 13 which rests elastically on the annular support 9 and is joined to the annular plate 14 through elastic joint points 12. The supporting point 11 of the annular support 9 may be welded or joined partially elastically under preload to the force transmission element 10. Important is the cavity 8, which may contain pressurized gas or vacuum. The wall thickness W of the central plate 13, the height H of the cavity 8, and the depth L of the setback are structurally optimized dimensions, as are also the areas of the central plate Zf and annular plate Rf.

Figure 4:
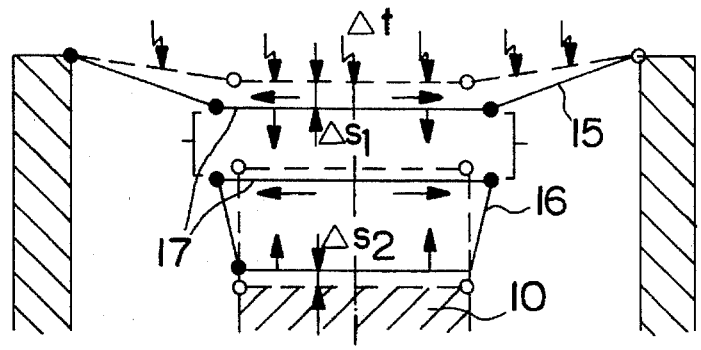
FIG. 4 Jointed bar simulation of the diaphragm support according to the invention in FIG. 3.

FIG. 4 shows an action form of the compensation by means of jointed bars to illustrate the double parallelogram action. The annular plate 14 is represented by jointed bar 15, the annular support 9 by jointed bar 16, and the central plate 13 by jointed bar 17. By optimizing the thickness W of the central plate 13 it is possible to ensure that it expands in its surface mainly, causing an upward compensation effect in the lower parallelogram, so that a much smaller error ΔS ΔS1 +ΔS2 results compared with FIG. 2.

Figure 5:
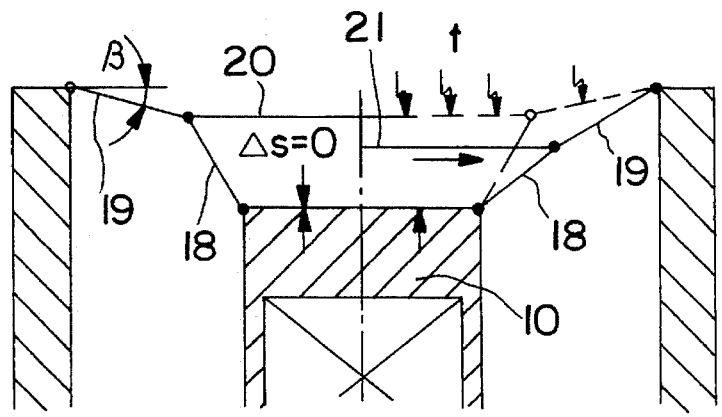
FIG. 5 Optimized simulation of a diaphragm support according to the invention in FIG. 3.

Another optimization example is shown in FIG. 5, where a conically shaped annular support 9 gives jointed bars 18, 19 with particularly good action. The lateral expansion of the central plate 13 according to jointed bars 20, 21 causes the force transmission element 10 to lift so much that an error of practically ΔS =0 may result.

Figure 6:
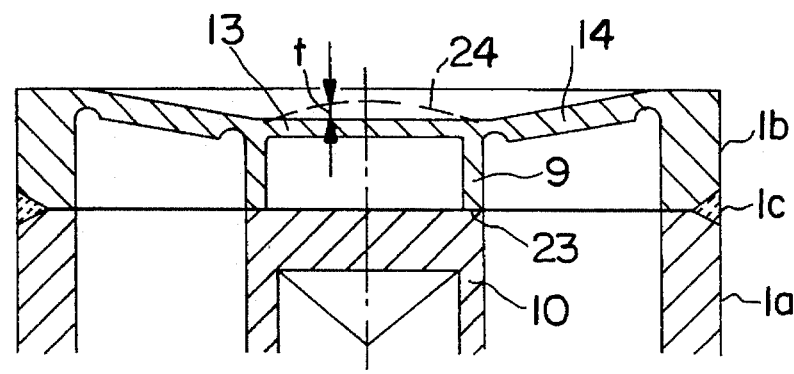
FIG. 6 Variant of a diaphragm support according to the invention.
Figure 7:
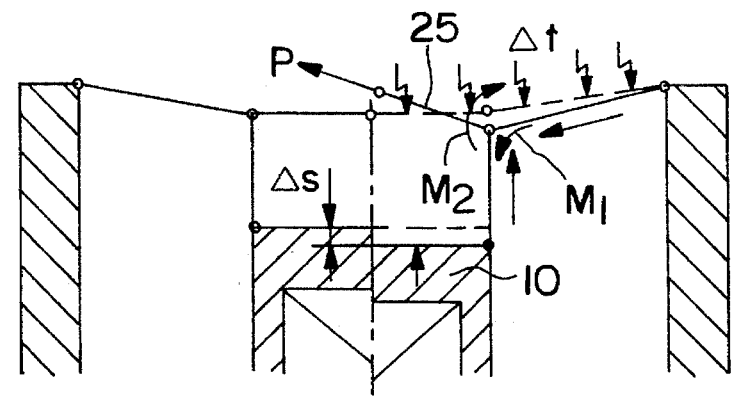
FIG. 7 Jointed bar simulation of the diaphragm in FIG. 6.

Another optimization variant is shown in FIG. 6, where the central plate 13 is optimized so that the greatest distortion 24 possible by the height t is obtained, so that a compensating effect may be achieved again, as shown in FIG. 7. The distortion causes a pulling action P of the jointed bar 25 and also a moment M2, raising the surface of the force transmission element 10 and countering the action of the moment M1 of the annular plate 14.

A portion of the outer sleeve 1b which includes the annual plate 14, central plate 13 and the annular support 9 is welded to outer sleeve 1a by weldment 1c. The annular support 9 is supported at 23 on the force transmission element.

Exhaustive trials have revealed that combinations of the two influences:

radial expansion and axial distortion of the central plate 13 occur simultaneously in reality, and thus assist the compensation process according to the invention.

Figure 8:
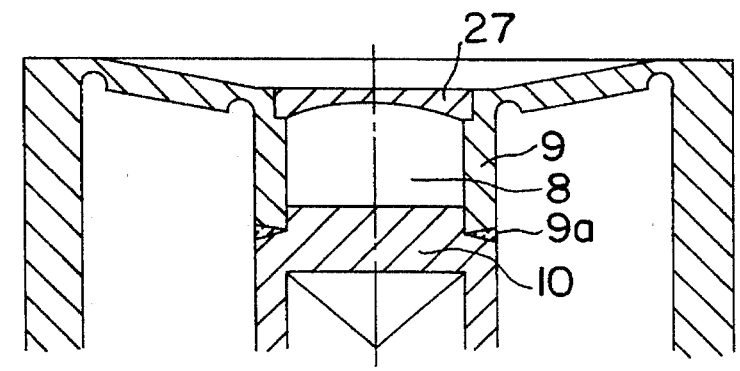
FIG. 8 Section through the diaphragm part according to the invention with separate central plate (27) sealed from outside.

FIG. 8 shows a variant of the diaphragm according to the invention, with a cavity 8 open to the outside but ultimately sealed by a central plate 27 placed on separately. This can be optimized in trial steps. The annular support 9 is welded to the force transmission element 10 by weldment 9a.

Figure 9:
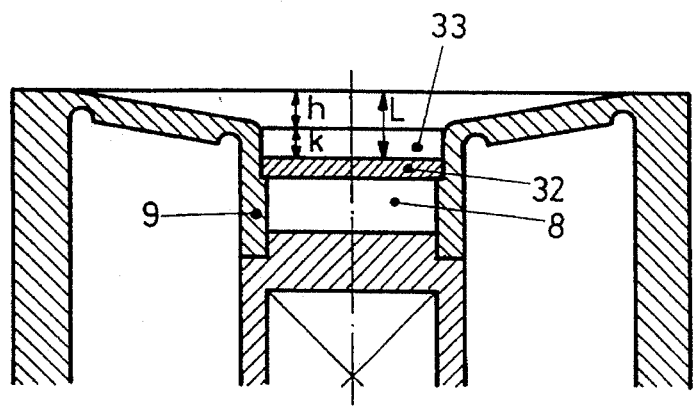
FIG. 9 Section through the variant according to FIG. 8 with separate central plate (32) set back.

FIG. 9 shows another variant of the diaphragm according to the invention, with the central plate 32 again placed in the annular support 9 from the front as an optimized separate element, set back by the dimension k to the most effective fitting depth h. This optimal depth might be determined by trials after fitting the transducer for example.

Figure 10:
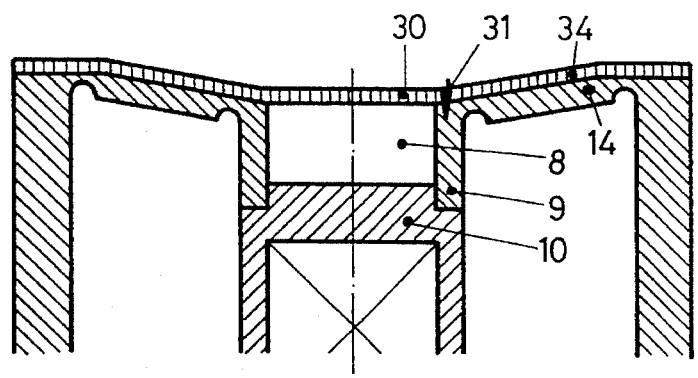
FIG. 10 Section through diaphragm part according to the invention with seal by elastic metal disk.

FIG. 10 shows another variant with the annular plate 14 and the cavity 8 formed by the annular support 9 sealed by an elastic metal disk 34. The newly created central plate 30 may be fixed by welding spots 31.

Figure 11:
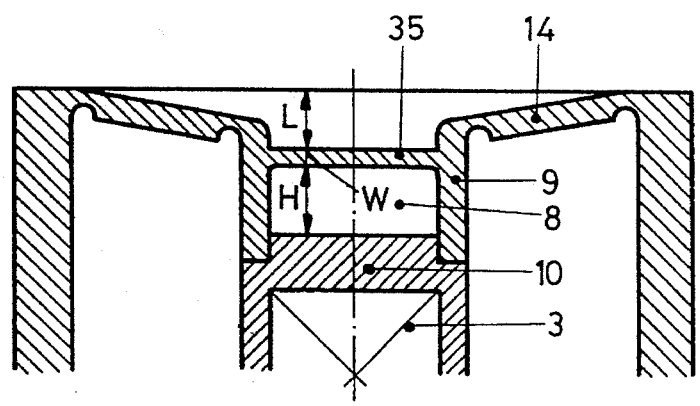
FIG. 11 Section through diaphragm part according to the invention with one-piece central plate set back.

FIG. 11 shows a further variant with a one-piece central plate 35 set back, which is joined rigidly or elastically to the annular support 9. Wall thickness W and setback L are optimized dimensions, which may be determined for example by individual trial steps on the test engine after fitting the transducer, so that maximum thermal shock compensation is secured for every transducer with regard to amplitude and duration.

Figure 12:
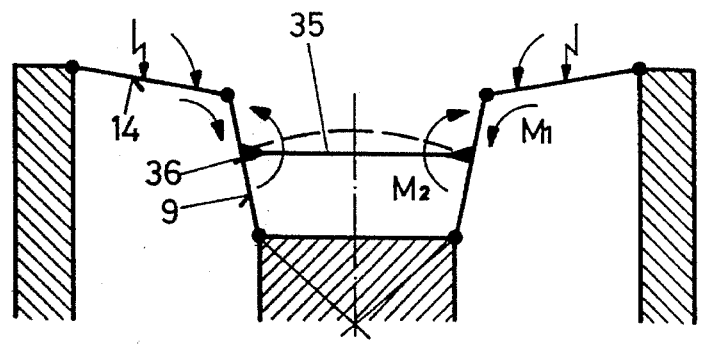
FIG. 12 Jointed bar simulation of the diaphragm support according to the invention in FIG. 11.

FIG. 12 shows by means of jointed bars how the embodiment according to FIG. 11 functions. The jointed bar 35 of the central plate is coupled rigidly to the jointed bar 9 of the annular support 9 so that it can transmit to the latter the moment M2 resulting from distortion. The annular plate 14 sets up the moment M1 in opposition to M2.

Figure 13:
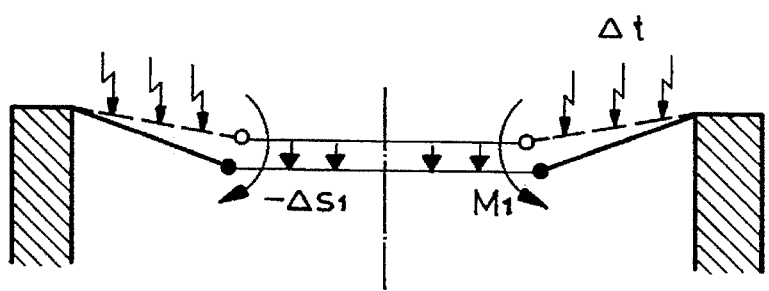
FIG. 13 Jointed bar simulation of upper parallelogram in FIG. 12.
Figure 14:
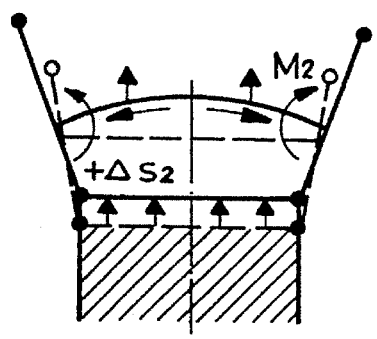
FIG. 14 Jointed bar simulation of lower parallelogram in FIG. 12.

FIGS. 13 and 14 show the two parallelograms of FIG. 12 separated. By optimization the two distortions −ΔS1 and +ΔS2 can be brought to the same value, so that M1≃M2 and further compensation of the thermal shock is obtained.

The inherent difficulty of thermal shock compensation is that displacements in the micrometer and nanometer ranges are involved, overlaid additionally by complex heat transfer values. It is therefore difficult to compensate the thermal shock effects for all operating states over a long running period.

The outlay on means for compensating thermal shock is therefore justified primarily in research applications, and even here mainly for watercoooled pressure transducers. Unfortunately water cooling imposes limits to miniaturization, so that high-precision research pressure transducers without water cooling have recently found use on a larger scale. Diaphragm diameters up to 3 mm are performing successfully.

The invention is based on the new idea of having a central part, the entire diaphragm that does not have to sustain alternating flexural forces, functioning as thermal actuator for compensating the thermal shock by means of a bridge girder structure with double parallelogram action.

Through the invention, a significant part of the diaphragm surface is exposed to a considerably higher average temperature. The joint points 12 are formed to create an efficient heat barrier to the central plate. This increases the average temperature and thereby reduces the gradients due to cyclic thermal shock of the central plate.

At the same time the heat flow onto the sensitive sensor parts is reduced by the heat flow shielding measures shown. Moreover no protective shields, coatings and frontal structures are needed, so that the sensitivity to acceleration of the diaphragm construction according to the invention can be reduced to a minimum. Furthermore the optimization of the compensation-controlling elements of the central plate 13, 27, 30, 32, 35 offers the new possibility of fine adaptation by stepwise alteration of the wall thickness W and the setback depth L, without altering other factors such as the stiffness of the diaphragm construction or its fatigue strength. Also the diaphragm construction according to the invention enables a stepwise adaptation performed in the engine under test, making possible optimal adaptation of the thermal shock compensation. New prospects for precision metrology in automobile engineering are opened up by this.

We claim:

1. A pressure transducer diaphragm structure compensated for thermal shock comprising:

an outer sleeve;

a central plate optimized for thermal shock compensation;

an annular plate joined to the outer sleeve;

an annular support joining the central plate and annular plate to a force transmission element of a pressure transducer and forming a cavity with the central plate and the force transmission element;

the outer sleeve, central plate, annular plate and annular support being dimensioned and connected in a bridge girder parallelogram type structure to move relative to each other so as to minimize introduction of forces into the force transmission element in response to thermal changes.

2. Pressure transducer diaphragm structure compensated for thermal shock according to claim 1 wherein the annular plate is inclined inward by the angle α and the annular plate is jointed elastically to the outer sleeve and to the annular support.

3. Pressure transducer diaphragm structure compensated for thermal shock according to claim 2, wherein the central plate is joined elastically to the annular support and is flush from the outside with the inclined annular plate.

4. Pressure transducer diaphragm structure compensated for thermal shock according to claim 2, wherein the central plate is jointed rigidly to the annular support and is flush from the outside with the inclined annular plate.

5. Pressure transducer diaphragm structure compensated for thermal shock according to claim 1, wherein the central plate is a separate part from the unitary annular plate and annular support.

6. Pressure transducer diaphragm structure compensated for thermal shock according to claim 1, wherein the central plate is one piece with the annular plate and the annular support and is set back by the dimension L, from the annular plate; and the thickness W of the central plate is optimized so that the thermal shock error is as small as possible.

7. Pressure transducer diaphragm structure compensated for thermal shock according to claim 1, wherein the joint points of the central plate to the diaphragm structure are formed to create a heat barrier, so that the central plate assumes a heightened average temperature and the gradients to the cyclic thermal shocks are reduced, contributing significantly to the thermal shock compensation.

8. Pressure transducer diaphragm structure compensated for thermal shock according to claim 1, wherein the annular support is welded onto the force transmission element.

9. Pressure transducer diaphragm structure compensated for thermal shock according to claim 1, wherein the annular support is pressed onto the force transmission element under mechanical preload.

10. Pressure transducer diaphragm structure compensated for thermal shock according to claim 1, wherein the central plate is part of a metal disk covering the entire front of the diaphragm structure.

11. A procedure for optimizing the thermal shock compensation on a pressure transducer diaphragm structure constructed according to claim 1 comprising:

testing a diaphragm structure in an engine; and modifying the wall thickness of the central plate by stepwise removal of material after said tests in the engine.

12. A procedure for optimizing the thermal shock compensation on pressure transducer diaphragm structure constructed according to claim 1, comprising:

testing a diaphragm structure in an engine; and adjusting the depth of the central plate from the front of the diaphragm structure stepwise after trials in the engine under test.

13. Pressure transducer diaphragm structure compensated for thermal shock according to claim 1, wherein the central plate is thin and flexurally elastic.

* * * * *